United States Patent
Waldbauer et al.

(10) Patent No.: US 9,896,092 B2
(45) Date of Patent: Feb. 20, 2018

(54) METHOD FOR REPRESENTING VEHICLE SURROUNDINGS

(71) Applicant: Continental Teves AG & Co. oHG, Frankfurt (DE)

(72) Inventors: Dirk Waldbauer, Eppstein (DE); Stefan Fritz, Erzhausen (DE); Thomas Berthold, Darmstadt (DE); Xiuxun Yin, Eschborn (DE); Andree Hohm, Obernburg (DE); Stefan Lueke, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/396,953

(22) PCT Filed: Apr. 4, 2013

(86) PCT No.: PCT/DE2013/100121
§ 371 (c)(1),
(2) Date: Oct. 24, 2014

(87) PCT Pub. No.: WO2013/159768
PCT Pub. Date: Oct. 31, 2013

(65) Prior Publication Data
US 2015/0105937 A1    Apr. 16, 2015

(30) Foreign Application Priority Data

Apr. 26, 2012  (DE) .................. 10 2012 103 669

(51) Int. Cl.
*B60W 30/08* (2012.01)
*G08G 1/16* (2006.01)

(52) U.S. Cl.
CPC ............. *B60W 30/08* (2013.01); *G08G 1/167* (2013.01)

(58) Field of Classification Search
CPC .... B60R 2300/30–2300/607; B60R 2300/804; B60R 2300/8086; B60R 2300/8093
See application file for complete search history.

(56) References Cited

U.S. PATENT DOCUMENTS 5,991,427 A    11/1999   Kakinami et al.
6,014,601 A    1/2000    Gustafson
(Continued)

FOREIGN PATENT DOCUMENTS

DE    197 38 764    3/1999
DE    103 55 807    7/2004
(Continued)

OTHER PUBLICATIONS

U.S. Dept. of Transportation Federal Highway Adminstration, "Manual on Uniform Traffic Control Devices (MUTCD): Chapter 3A. General", Aug. 3, 2004, <http://mutcd.fhwa.dot.gov/HTM/2003r1/part3/part3a.htm>.*
(Continued)

*Primary Examiner* — Genna M Mott
(74) *Attorney, Agent, or Firm* — W. F. Fasse

(57) ABSTRACT

In a method and a driver assistance system for representing vehicle surroundings of a vehicle having a sensor system for detecting the environment, a boundary of a traffic lane or driving path on which the vehicle is currently being driven is represented by position points that each have a predefined set of attributes especially including a width attribute indicating a lateral width of an unobstructed area available as a maneuvering space on an opposite side of the respective position point.

22 Claims, 6 Drawing Sheets

(56) References Cited

U.S. PATENT DOCUMENTS

| | | | |
|---|---|---|---|
| 6,269,308 | B1 | 7/2001 | Kodaka et al. |
| 6,433,679 | B1 | 8/2002 | Schmid |
| 6,466,516 | B1 | 10/2002 | O'Brien, Jr. et al. |
| 6,498,972 | B1 | 12/2002 | Rao et al. |
| 7,138,909 | B2 | 11/2006 | Winner |
| 7,340,380 | B2 | 3/2008 | Klotz et al. |
| 7,382,236 | B2 | 6/2008 | Maass et al. |
| 7,486,803 | B2 | 2/2009 | Camus |
| 7,495,550 | B2 | 2/2009 | Huang et al. |
| 7,680,749 | B1 | 3/2010 | Golding et al. |
| 7,792,641 | B2 | 9/2010 | Liu et al. |
| 8,072,370 | B2 | 12/2011 | Woodington et al. |
| 8,410,920 | B2 | 4/2013 | Ito |
| 8,812,193 | B2 | 8/2014 | Lueke et al. |
| 8,842,884 | B2 | 9/2014 | Klein et al. |
| 8,880,272 | B1* | 11/2014 | Ferguson ............ G05D 1/0212 701/23 |
| 2001/0016798 | A1 | 8/2001 | Kodaka et al. |
| 2002/0031242 | A1 | 3/2002 | Yasui et al. |
| 2003/0072471 | A1 | 4/2003 | Otsuka et al. |
| 2003/0174054 | A1 | 9/2003 | Shimomura |
| 2004/0143381 | A1 | 7/2004 | Regensburger et al. |
| 2005/0125121 | A1 | 6/2005 | Isaji et al. |
| 2005/0259158 | A1 | 11/2005 | Jacob et al. |
| 2007/0158593 | A1 | 7/2007 | Partin et al. |
| 2007/0219720 | A1* | 9/2007 | Trepagnier ............ B60W 30/00 701/300 |
| 2007/0233386 | A1* | 10/2007 | Saito ............ B62D 15/025 701/300 |
| 2007/0276600 | A1 | 11/2007 | King et al. |
| 2008/0027607 | A1 | 1/2008 | Ertl et al. |
| 2008/0042812 | A1 | 2/2008 | Dunsmoir et al. |
| 2008/0195292 | A1 | 8/2008 | Naab et al. |
| 2008/0204212 | A1 | 8/2008 | Jordan et al. |
| 2009/0037055 | A1 | 2/2009 | Danner et al. |
| 2009/0088966 | A1 | 4/2009 | Yokoyama et al. |
| 2009/0195414 | A1 | 8/2009 | Riegel et al. |
| 2010/0013917 | A1 | 1/2010 | Hanna et al. |
| 2010/0097200 | A1 | 4/2010 | Hilsebecher et al. |
| 2010/0253598 | A1* | 10/2010 | Szczerba ............ G01S 13/723 345/7 |
| 2010/0256852 | A1 | 10/2010 | Mudalige |
| 2010/0289632 | A1 | 11/2010 | Seder et al. |
| 2010/0329513 | A1 | 12/2010 | Klefenz |
| 2011/0121993 | A1 | 5/2011 | Davis et al. |
| 2011/0190972 | A1 | 8/2011 | Timmons et al. |
| 2011/0199200 | A1 | 8/2011 | Lueke et al. |
| 2011/0313665 | A1 | 12/2011 | Lueke et al. |
| 2012/0139775 | A1 | 6/2012 | Popovic |
| 2012/0290184 | A1* | 11/2012 | Suzuki ............ G08G 1/165 701/93 |
| 2012/0303258 | A1 | 11/2012 | Pampus et al. |
| 2012/0323479 | A1 | 12/2012 | Nagata |
| 2013/0173232 | A1* | 7/2013 | Meis ............ G06K 9/00798 703/2 |
| 2013/0184976 | A1 | 7/2013 | Akiyama et al. |
| 2013/0197804 | A1 | 8/2013 | Lueke et al. |
| 2013/0218448 | A1* | 8/2013 | Suzuki ............ G01S 13/931 701/300 |
| 2014/0032047 | A1 | 1/2014 | Voelz et al. |
| 2014/0160250 | A1 | 6/2014 | Pomerantz et al. |
| 2014/0249722 | A1 | 9/2014 | Hegemann et al. |
| 2015/0022392 | A1* | 1/2015 | Hegemann ............ G01S 7/003 342/146 |
| 2015/0105937 | A1 | 4/2015 | Waldbauer et al. |
| 2015/0146008 | A1 | 5/2015 | Conner et al. |
| 2015/0149076 | A1 | 5/2015 | Strauss et al. |

FOREIGN PATENT DOCUMENTS

| | | |
|---|---|---|
| DE | 102004018681 | 11/2005 |
| DE | 102005002719 | 8/2006 |
| DE | 102006020631 | 11/2007 |
| DE | 102006040333 | 3/2008 |
| DE | 102006056835 | 6/2008 |
| DE | 102007013023 | 9/2008 |
| DE | 102007016868 | 10/2008 |
| DE | 102009007412 | 8/2010 |
| DE | 102009045286 | 4/2011 |
| DE | 102010006828 | 8/2011 |
| DE | 102010042440 | 4/2012 |
| EP | 0 640 903 | 3/1995 |
| EP | 1 346 877 | 9/2003 |
| EP | 1 552 975 | 7/2005 |
| EP | 2012211 A1 * | 1/2009 ............ G08G 1/167 |
| EP | 2 541 524 | 1/2013 |
| JP | 2005-182753 A | 7/2005 |
| JP | 2007-331652 A | 12/2007 |
| JP | 2008-143263 A | 6/2008 |
| JP | 2009-023399 A | 2/2009 |
| JP | 2010-524102 A | 7/2010 |
| JP | 2012-003419 A | 1/2012 |
| JP | 2012-079118 A | 4/2012 |
| JP | 2013-533990 A | 8/2013 |
| WO | WO 04/094186 | 11/2004 |
| WO | WO 2008/122498 | 10/2008 |
| WO | WO 2011/101988 | 8/2011 |
| WO | WO 2011/141018 | 11/2011 |

OTHER PUBLICATIONS

U.S. Dept. of Transportation Federal Highway Adminstration, "Manual on Uniform Traffic Control Devices (MUTCD): Chapter 3B. General", Feb. 11, 2010, <http://mutcd.fhwa.dot.gov/htm/2009/part3/part3b.htm>.*

Math Open Reference. "Point". Oct. 30, 2006. <http://www.mathopenref.com/point.html>.*

Encyclopedia of Mathematics. "Line (Curve)". Feb. 7, 2011. <https://www.encyclopediaofmath.org/index.php?title=Line_(curve)&oldid=15722>.*

Xia Huang et al., "Lane Following System for a Mobile Robot Using Information from Vision and Odometry", IEEE CCECE 2011, 24th Canadian Conference, May 2011, Niagara Falls, Canada, pp. 1009 to 1013.

C. Blaschke, J. Schmitt, B. Färber; "Überholmanöver-Prädiktion über CAN-BUS-Daten"; ("Overtaking Maneuver Prediction via CAN-Bus Data"); Automobiltechnische Zeitschrift (ATZ), vol. 110, No. 11/2008, pp. 1022-1029.

M. Kretschmer, L. König, J. Neubeck, J. Wiedemann; "Erkennung und Prädiktion des Fahrverhaltens während eines Überholvorgangs"; ("Detection and Prediction of the Driver's Behavior during an Overtaking Maneuver"); 2. Tagung Aktive Sicherheit durch Fahrerassistenz, Garching, Germany, 2006, with English abstract, pp. 1 to 17, FKFS-IVK.

C. Wojek, B. Schiele; "A Dynamic Conditional Random Field Model for Joint Labeling of Object and Scene Classes"; European Conference on Computer Vision (ECCV), Marseille, France, 2008, ECCV 2008, Part IV, LNCS 5305, pp. 733-747.

International Search Report of the International Searching Authority for International Application PCT/DE2013/100121, dated Oct. 21, 2013, 2 pages, European Patent Office, HV Rijswijk, Netherlands.

English Translation of PCT International Preliminary Report on Patentability of the International Searching Authority for International Application PCT/DE2013/100121, dated Dec. 4, 2014, 5 pages, International Bureau of WIPO, Geneva, Switzerland.

German Search Report for German Application No. 10 2012 103 669.1, dated Dec. 21, 2012, 5 pages, Muenchen, Germany, with English translation, 5 pages.

Radu Danescu et al., "Modeling and Tracking the Driving Environment With a Particle-Based Occupancy Grid", IEEE Transactions on Intelligent Transportation Systems, Dec. 1, 2011, IEEE, Piscataway, NJ, USA, vol. 12, No. 4, XP011379328, pp. 1331 to 1342.

Christof Schroeter et al., "A Sensor-Independent Approach to RBPF SLAM—Map Match SLAM Applied to Visual Mapping", Intelligent Robots and Systems, Sep. 22, 2008, IEEE, Piscataway, NJ, USA, XP032335734, pp. 2078 to 2083.

(56) References Cited

OTHER PUBLICATIONS

Radu Danescu et al., "Particle Grid Tracking System Stereovision Based Obstacle Perception in Driving Environments", IEEE Intelligent Transportation Systems Magazine, Apr. 1, 2012, IEEE, USA, vol. 4. No. 1, XP011393203, pp. 6 to 20.
Cyrill Stachniss et al., "Exploration with Active Loop-Closing for, FastSLAM", Intelligent Robots and Systems, Sep. 28, 2004, IEEE, Piscataway, NJ, USA, vol. 2, XP010765873, pp. 1505 to 1510.
European Office Action in European Patent Application No. 13 719 008.8, dated Oct. 2, 2017, 6 pages, with partial English translation, 2 pages.

* cited by examiner

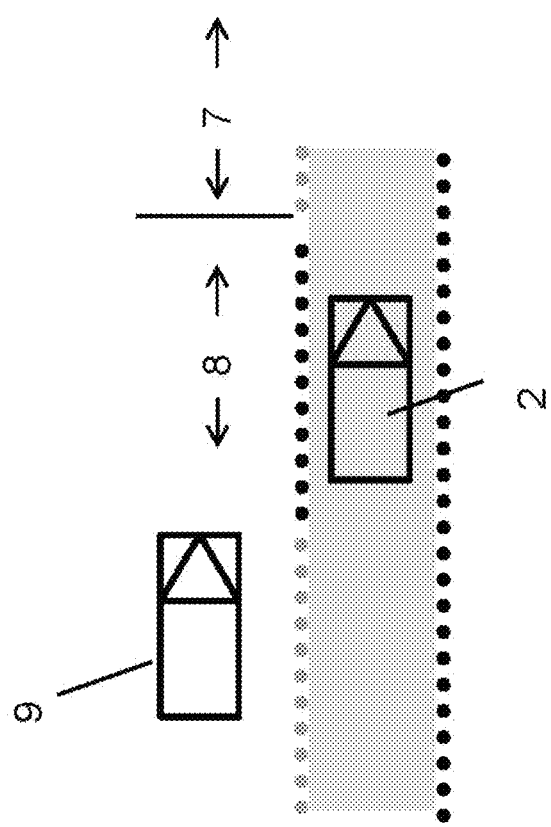

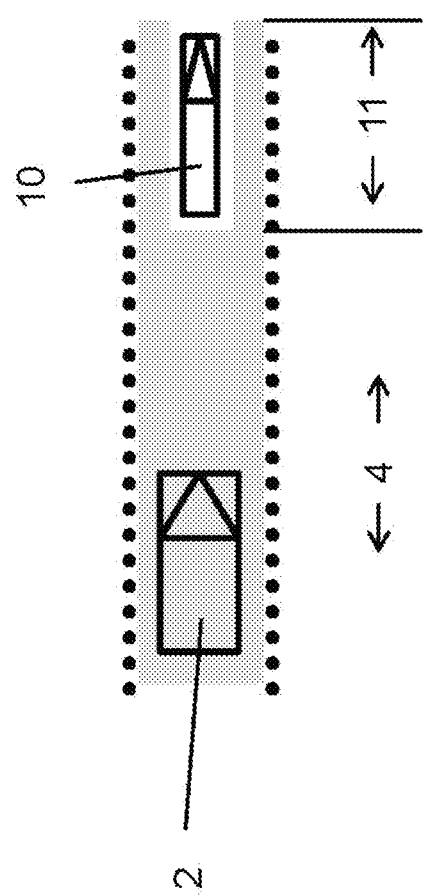

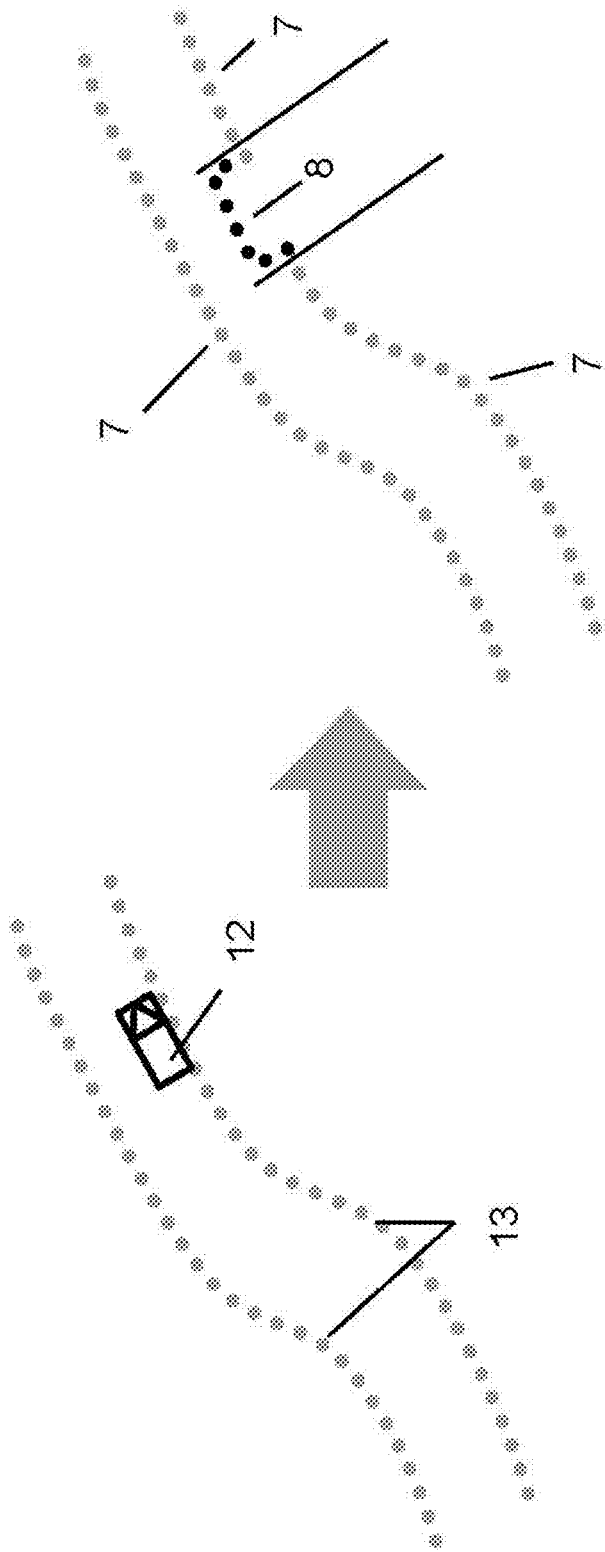

METHOD FOR REPRESENTING VEHICLE SURROUNDINGS

FIELD OF THE INVENTION

The invention relates to a driver assistance system and a method using position points for representing features in an environment of a vehicle.

BACKGROUND INFORMATION

Nearly all currently available driver assistance systems based on data provided by environment monitoring sensors use an object abstract environment model. Typically an object list of surrounding objects is provided. Such an approach does not cover areas where no objects are present and which define a potential maneuvering space. In the field of research, approaches are known which use sensors providing space occupancy information about a defined area surrounding the vehicle and entering said information on a space occupancy map. Such a representation permits indirect estimations of the available maneuvering space. A disadvantage of this method, however, is that the space occupancy map (occupancy grid) contains large amounts of data which are currently too large to be usable in a commercial application, since the bandwidths provided by typical CAN connections for the communication between control devices are not sufficient for real-time transmission.

SUMMARY OF THE INVENTION

It is an object of one or more embodiments of the present invention to provide a method and a driver assistance system for representing a maneuvering space in a vehicle environment using a reduced amount of data.

The above object can be accomplished with a method and a driver assistance system according to at least one embodiment of the invention as disclosed herein.

A key component of at least one embodiment of the present invention is the representation of a succession of boundaries of a driving path or traffic lane currently being driven, by position points that each have a predefined set of attributes. The succession of boundaries results e.g. from the positions of traffic lane markings, roadwork or construction site fences, roadside structures, guardrails, parked vehicles at the roadside, etc.

Preferably, the distance, in particular a longitudinal spacing distance, and the number of position points can be predefined adaptively depending on at least one of the following parameters:

i) speed of the ego-vehicle (i.e. the subject vehicle itself); for example, a large longitudinal distance between the position points will be selected for representing traffic lane markings in particular in motorway scenarios in which the subject vehicle is driving at a relatively high speed; a correspondingly smaller distance between the position points is preferentially selected for modeling the maneuvering space boundaries during parking maneuvers when the subject vehicle is driving at a relatively low speed. Namely, in such an embodiment, a large distance is chosen when driving at high speed and, correspondingly, a small distance when driving at low speed;

ii) complexity of the scenario; e.g. a small distance between the position points is required in a driving situation in the city with many surrounding objects and traffic signs;

iii) curve of the traffic lane; a small distance between the position points is required on winding road sections;

iv) width of the traffic lane; in particular, if the traffic lane becomes wider, a larger distance between the position points can be selected.

In a preferred embodiment of the present invention, an attribute of the position points indicates a lateral width. The lateral width is a measurement of an area that is usable as a maneuvering space by the subject vehicle and located on the other side of the position point, i.e. outside the driving path or traffic lane delimited by the position points. The lateral width is e.g. large if another driving path or traffic lane where the subject vehicle can be freely driven is present on the other side of traversable traffic lane markings. The lateral width will be set e.g. to a small value or to zero if a non-traversable roadside structure, e.g. a slope, directly starts on the other side of traversable traffic lane markings. Preferably, the lateral width directly indicates the width of a maneuvering space opposite a position point.

The lateral width of position points representing non-traversable traffic lane boundaries such as guardrails or roadwork or construction site fences preferably equals zero.

In a further embodiment of the present invention, the lateral width of position points representing traversable traffic lane markings is larger than zero.

In another preferred embodiment of the invention, the lateral width of position points representing traversable traffic lane markings equals zero if a lane change of the subject vehicle or ego-vehicle to the adjacent lane, wherein the adjacent lane is also delimited by the position points, would at this position lead to a risk of collisions with oncoming or overtaking vehicles.

In an advantageous embodiment of the invention there is a further attribute of the position points. The further attribute indicates a measure of a narrowing of the area inside the driving path or traffic lane delimited by the position points that is usable as maneuvering space. In other words, this attribute indicates whether the whole area delimited by the position points can be used as maneuvering space or whether there are obstacles which must be bypassed.

In particular, the further attribute is assigned a predefined standard value if no obstacle is present in the traffic lane. In a further advantageous embodiment of the invention, the further attribute assumes a value deviating from the predefined standard value in the case of position points delimiting a road section where an obstacle is present. In an advantageous embodiment, the further attribute indicates which area and/or how much space is actually available as maneuvering space.

A further embodiment is directed to a method for a driver assistance system which determines for a vehicle a future trajectory based on data provided by a sensor system for detecting the environment. For this purpose, surrounding objects and their positions are detected using the sensor data, and the vehicle surroundings of the subject vehicle or ego-vehicle are represented via position points that bound an available driving path according to a method as described above. This representation of the surroundings is transmitted via a vehicle bus to a control device. The control device is designed and configured in such a way that a future trajectory of the ego-vehicle is determined dependent on the position points.

An additional embodiment is directed to a driver assistance system with a sensor system for detecting the environment, and a data evaluation unit configured to execute, and operating by a method as described above. For this purpose, the data evaluation unit is connected via a vehicle bus system to a control device which controls a driver assistance function.

BRIEF DESCRIPTION OF THE DRAWINGS

In the following, the invention will be described in greater detail in connection with embodiments thereof, and with reference to the accompanying drawings, wherein:

FIG. 4 is a schematic top view diagram of a vehicle driving along a traffic lane or driving path, with another vehicle in an adjacent lane;

FIG. 5 is a schematic top view diagram of the vehicle approaching an obstacle such as a motor bike;

FIG. 6a is a schematic top view diagram showing an obstacle such as a parked car adjacent to a boundary of the traffic lane or driving path for a subject vehicle; and FIG. 6b is a schematic top view diagram based on FIG. 6a, but showing non-traversable position points defining a portion of the boundary skirting around the parked car obstacle.

DETAILED DESCRIPTION OF EXAMPLE EMBODIMENTS OF THE INVENTION

Figure 1:
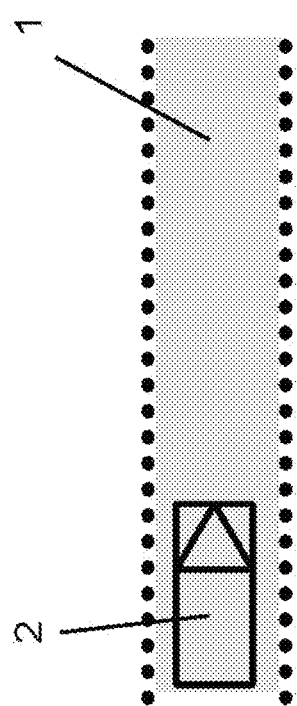
FIG. 1 is a schematic top view diagram of a vehicle driving on a traffic lane or driving path.
Figure 2:
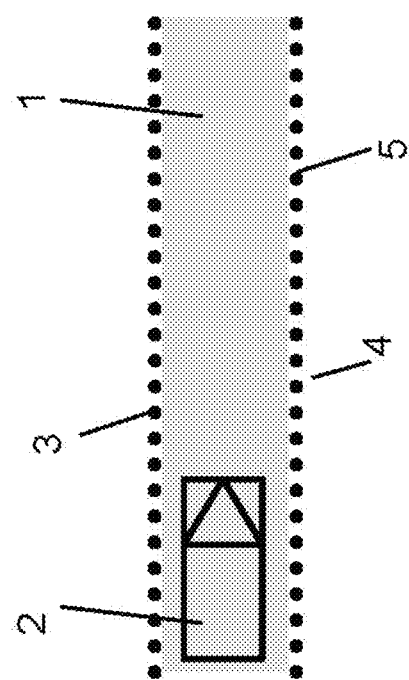
FIG. 2 is a diagram similar to FIG. 1 emphasizing position points with attributes defining right and left boundaries of the traffic lane.
Figure 3:
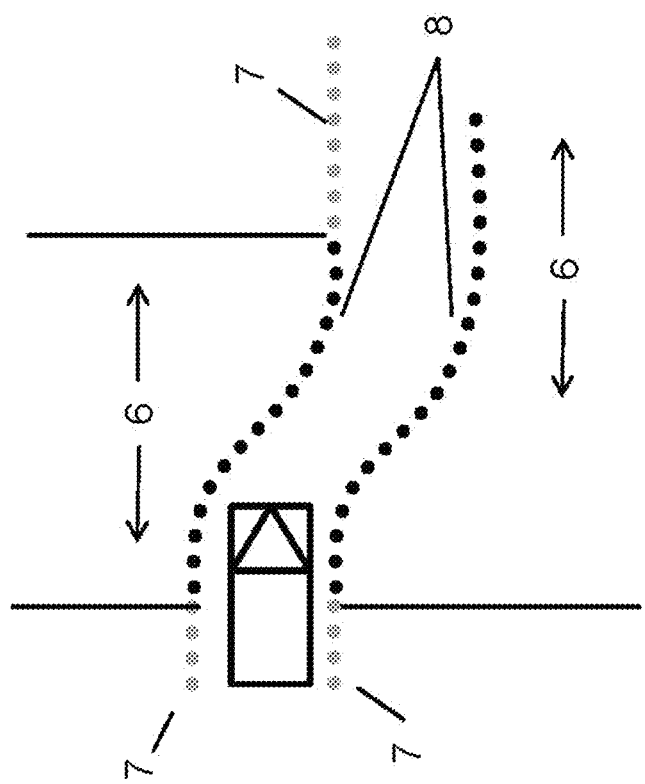
FIG. 3 is a schematic top view diagram of a vehicle driving along a traffic lane or driving path in the area of a roadwork or construction site, representing traversable position points and non-traversable position points bounding the traffic lane or driving path.

The starting point for an understanding of an embodiment of the invention is the driving path or traffic lane 1 currently being driven on by the subject vehicle or ego-vehicle 2 as illustrated in FIG. 1. The driving path or traffic lane is defined as the open space ahead of the subject vehicle, laterally out to the respective left and right lateral boundaries 3 and 4, as shown in FIG. 2. These boundaries 3 and 4 may represent, for example, traffic lane markings, structural boundaries, in particular roadwork or construction site traffic barriers, and/or static objects which laterally restrict the driving path or traffic lane currently being driven. The course and the form of the driving path or traffic lane 1 are preferably represented by both a left-side and a right-side list of position points 5. The number of position points 5 and the longitudinal distance between them can be adapted to the current requirements of the respective situation according to criteria such as the speed of the subject vehicle 2 itself or the complexity of the scenario. Each position point 5 can have a certain predefined set of attributes as illustrated in FIG. 2. An important attribute in this context is the lateral width of the area on the other side of the position point. Such a representation covers e.g. also the "non-traversable" property by providing a value of zero for the lateral width, as e.g. illustrated in FIG. 3. There the vehicle is driving into a roadwork or construction site area 6. In the area where the traffic lane 1 adjoins the construction site 6, the non-traversable or non-crossable position points 8 are assigned the attribute of the lateral width being equal to zero. Outside the area of the construction site 6, the traversable position points 7 are assigned the attribute of the lateral width being larger than zero.

The width of the traffic lane 1 that is usable as maneuvering space can also be restricted by moving objects, for example other vehicles, on the other side of the boundary line. In a preferred embodiment of the present invention, this restriction is described by the attribute of lateral width. Even if the line is physically traversable at the moment of observation, a traffic lane boundary is marked as "non-traversable", in particular using position points 8, if a crossing of the boundary is unsafe due to an oncoming traffic situation or due to another vehicle 9 approaching and overtaking from behind, as illustrated in FIG. 4.

FIG. 6a shows an exemplary scene where a lane is narrowed at one point by a stationary vehicle 12 at the roadside. The boundaries 13 on both sides of the lane are traversable. The identical scene is illustrated in FIG. 6b with position points 7, 8 delimiting the traffic lane 1; the outline of the stationary vehicle 12 was taken into account. The position points 8 delimiting the stationary vehicle are assigned the attribute of lateral width equal zero because the traffic lane boundary is not traversable at this point. The other position points 7 which are not delimiting the stationary vehicle are assigned the attribute of lateral width larger than zero because the traffic lane boundary is traversable at this point.

Stationary objects occupying the traffic lane currently being driven can be modeled by using a further attribute representing the remaining maneuvering space between the two boundary lines. This attribute assumes a predefined standard value if no obstacle is present on the traffic lane. In a preferred embodiment of the invention, the further attribute otherwise assumes the remaining free space as a physical distance value. This scenario is illustrated exemplarily in FIG. 5. Shown there is an obstacle 10 (in this case a stationary motorbike) on the traffic lane 1 of the ego-vehicle 2. Position points 11 with attributes indicate the narrowing at the position of the obstacle.

Advantages of the invention presented here are the complete description of the open space ahead within the current traffic lane and the representation of the lateral traversability as a basis for determining the trajectory for leaving the traffic lane currently being driven, if necessary. The particular advantage of representing the situation using a list of boundary points is the fact that arbitrary traffic lane courses can be described, and the effort involved is also smaller than required by an analytical representation. It is possible to represent arbitrary courses of the current traffic lane; the abstract point information greatly reduces the required amounts of data compared to a dense open space representation, permitting the use of production-ready means of communication such as CAN. In particular, the representation of the boundaries of the current path is sensor-independent, meaning that whenever new features become detectable by new sensors, it is no problem to account for said features in the representation; one example of this would be curbs.

REFERENCE SYMBOL LIST 1 traffic lane currently being driven
2 ego-vehicle, i.e. subject vehicle
3 left traffic lane boundary
4 right traffic lane boundary
5 position point with attributes
6 road work or construction site
7 traversable position point with a lateral width larger than zero
8 non-traversable position point with a lateral width equal zero
9 other vehicle
10 obstacle in the traffic lane, e.g. a stationary object (motorbike)

11 position point with the attribute narrowing larger than zero
12 vehicle at the roadside
13 traversable boundaries on both sides

The invention claimed is:

1. A driver assistance method for a subject vehicle that is driving on a road, and that has a sensor system and a driver assistance system including an evaluation unit and a control device, wherein the method comprises:
   a) with the sensor system, detecting features in an environment ahead of the subject vehicle and producing sensor data representing the features, wherein the features include traffic lane markings on the road, physical boundaries of or on the road, and obstacles on the road;
   b) with the driver assistance system, evaluating the sensor data and based on the detected features represented by the sensor data, determining a driving path that is available for the subject vehicle to drive along the road ahead of the subject vehicle;
   c) with the driver assistance system, determining a succession of position points representing a boundary of the driving path, wherein the position points are spaced apart from one another and discontinuous along the boundary, and assigning respective attribute values to a predefined set of attributes respectively allocated to each one of the position points, wherein the attributes include a width attribute, and wherein the respective attribute value assigned to the width attribute of a respective one of the position points indicates a lateral width of an unobstructed area that is available as a maneuvering space for the subject vehicle outside of the driving path on an opposite side of the respective position point; and
   d) with the control device, executing a driver assistance function for the subject vehicle dependent on the position points and the attribute values assigned to the attributes of the position points;
   wherein:
      the traffic lane markings on the road include a traversable lane marking that indicates a traffic instruction permitting motor vehicles to cross the traversable lane marking, and at least a portion of the boundary coincides with the traversable lane marking,
      the detected features include at least one of the obstacles on the road outside of the driving path on an opposite side of the boundary,
      the at least one obstacle would present a collision risk for the subject vehicle if the subject vehicle would traverse the portion of the boundary, and
      the method further comprises specifying that the portion of the boundary is a non-traversable boundary by assigning zero as the respective attribute value of the width attribute for each one of the position points representing the portion of the boundary.

2. The driver assistance method according to claim 1, wherein the at least one obstacle is another vehicle that is overtaking or oncoming relative to the subject vehicle.

3. A driver assistance method for a subject vehicle that is driving on a road, and that has a sensor system and a driver assistance system including an evaluation unit and a control device, wherein the method comprises:
   a) with the sensor system, detecting features in an environment ahead of the subject vehicle and producing sensor data representing the features, wherein the features include traffic lane markings on the road, physical boundaries of or on the road, and obstacles on the road;
   b) with the driver assistance system, evaluating the sensor data and based on the detected features represented by the sensor data, determining a driving path that is available for the subject vehicle to drive along the road ahead of the subject vehicle;
   c) with the driver assistance system, determining a succession of position points representing a boundary of the driving path, wherein the position points are spaced apart from one another and discontinuous along the boundary, and assigning respective attribute values to a predefined set of attributes respectively allocated to each one of the position points, wherein the attributes include a width attribute, and wherein the respective attribute value assigned to the width attribute of a respective one of the position points indicates a lateral width of an unobstructed area that is available as a maneuvering space for the subject vehicle outside of the driving path on an opposite side of the respective position point; and
   d) with the control device, executing a driver assistance function for the subject vehicle dependent on the position points and the attribute values assigned to the attributes of the position points;
      wherein the attributes of each one of the position points further include a lane space attribute, and
      wherein the respective attribute value assigned to the lane space attribute of a respective one of the position points indicates a lateral width of an unobstructed area that is available as a driving space for the subject vehicle in the driving path bounded by the respective position point.

4. The driver assistance method according to claim 3, wherein, when none of the obstacles are detected on the road in the driving path adjacent to a respective one of the position points, then the respective attribute value assigned to the lane space attribute of the respective position point corresponds to a predefined lane width value.

5. The driver assistance method according to claim 3, wherein, when one of the obstacles is detected on the road in the driving path adjacent to a respective one of the position points, then the respective attribute value assigned to the lane space attribute of the respective position point is an actual value of the lateral width of the unobstructed area between the position point and the detected obstacle.

6. A driver assistance method for a subject vehicle that is driving on a road, and that has a sensor system and a driver assistance system including an evaluation unit and a control device, wherein the method comprises:
   a) with the sensor system, detecting features in an environment ahead of the subject vehicle and producing sensor data representing the features, wherein the features include traffic lane markings on the road, physical boundaries of or on the road, and obstacles on the road;
   b) with the driver assistance system, evaluating the sensor data and based on the detected features represented by the sensor data, determining a driving path that is available for the subject vehicle to drive along the road ahead of the subject vehicle;
   c) with the driver assistance system, determining a succession of position points representing a boundary of the driving path, wherein the position points are spaced apart from one another and discontinuous along the boundary, and assigning respective attribute values to a predefined set of attributes respectively allocated to each one of the position points, wherein the attributes include a width attribute, and wherein the respective attribute value assigned to the width attribute of a respective one of the position points indicates a lateral width of an unobstructed area that is available as a maneuvering space for the subject vehicle outside of the driving path on an opposite side of the respective position point; and d) with the control device, executing a driver assistance function for the subject vehicle dependent on the position points and the attribute values assigned to the attributes of the position points;

wherein the attribute values assigned to the width attribute of the position points are determined based on presence or absence, and position, of a moving object in a traffic lane adjacent to the driving path on the opposite side of the position points, such that the attribute value of the width attribute of a given one of the position points at a given location varies over time.

7. The driver assistance method according to claim 6, wherein the attribute value of the width attribute of the given one of the position points is set to zero when the moving object is detected in the traffic lane adjacent to the driving path, and is set to a positive lane width value when no moving object is detected in the traffic lane adjacent to the driving path.

8. A driver assistance method for a subject vehicle that is driving on a road, and that has a sensor system and a driver assistance system including an evaluation unit and a control device, wherein the method comprises:

a) with the sensor system, detecting features in an environment ahead of the subject vehicle and producing sensor data representing the features, wherein the features include physical boundaries of or on the road, and obstacles on the road;

b) with the driver assistance system, evaluating the sensor data and based on the detected features represented by the sensor data, determining a driving path that is available for the subject vehicle to drive along the road ahead of the subject vehicle;

c) with the driver assistance system, determining a succession of position points representing a boundary of the driving path, wherein the position points are spaced apart from one another and discontinuous along the boundary, and respectively assigning to each individual respective one of the position points, a respective individual traversability indicator value that indicates whether a respective portion of the boundary represented by the respective position point is traversable because the respective boundary portion may be safely crossed by the subject vehicle or is non-traversable because the respective boundary portion may not be safely crossed by the subject vehicle, wherein first ones of the position points have the traversability indicator values indicating that the boundary portions represented by the first position points are traversable and second ones of the position points have the traversability indicator values indicating that the boundary portions represented by the second position points are non-traversable; and d) with the control device, executing a driver assistance function for the subject vehicle dependent on the position points and the traversability indicator values assigned thereto.

9. A driver assistance method for a subject vehicle that is driving on a road, and that has a sensor system and a driver assistance system including an evaluation unit and a control device, wherein the method comprises the steps:

a) with the sensor system, detecting features in an environment ahead of the subject vehicle and producing sensor data representing the features, wherein the features include traffic lane markings on the road, physical boundaries of or on the road, and obstacles on the road;

b) with the driver assistance system, evaluating the sensor data and based on the detected features represented by the sensor data, determining a driving path that is available for the subject vehicle to drive along the road ahead of the subject vehicle;

c) with the driver assistance system, determining a succession of position points representing a boundary of the driving path, wherein the position points are discontinuous and spaced apart from one another by a longitudinal spacing distance along the boundary, and determining a length of the longitudinal spacing distance between a respective one of the position points and a next successive one of the position points dependent on at least one of the following parameters:

c1) an actual current speed of the subject vehicle, c2) a complexity of the features in the environment at an area of the respective position point, c3) a curvature of the driving path at an area of the respective position point, and/or c4) a local width of the driving path at an area of the respective position point, d) with the driver assistance system, assigning respective attribute values to a predefined set of attributes respectively allocated to each one of the position points, wherein the attributes include a width attribute, and wherein the respective attribute value assigned to the width attribute of the respective position point indicates a lateral width of an unobstructed area that is available as a maneuvering space for the subject vehicle outside of the driving path on an opposite side of the respective position point; and e) with the control device, executing a driver assistance function for the subject vehicle dependent on the position points and the attribute values assigned to the attributes of the position points.

10. The driver assistance method according to claim 9, wherein the step c) comprises determining the length of the longitudinal spacing distance dependent on the actual current speed of the subject vehicle.

11. The driver assistance method according to claim 9, wherein the step c) comprises determining the length of the longitudinal spacing distance dependent on the complexity of the features in the environment.

12. The driver assistance method according to claim 9, wherein the step c) comprises determining the length of the longitudinal spacing distance dependent on the curvature of the driving path.

13. The driver assistance method according to claim 9, wherein the step c) comprises determining the length of the longitudinal spacing distance dependent on the local width of the driving path.

14. The driver assistance method according to claim 9, wherein:

in the step b) the driving path is determined corresponding to a traffic lane on the road identified by the traffic lane markings on the road, and in the step c) the position points are determined directly along the locations of the traffic lane markings on the road.

15. The driver assistance method according to claim 9, wherein:

the physical boundaries and the obstacles are positioned on the road and include roadwork or construction site barriers, structures, guardrails and/or parked vehicles on the road, in the step b) the driving path is determined as deviating from a traffic lane on the road identified by the traffic lane markings on the road so as to skirt around the physical boundaries and the obstacles, and in the step c) the position points are determined along and skirting around the physical boundaries and the obstacles independent of and deviating from the traffic lane markings.

16. The driver assistance method according to claim 9, further comprising specifying that at least a portion of the boundary is a non-traversable boundary by assigning zero as the respective attribute value of the width attribute for each one of the position points representing the portion of the boundary.

17. The driver assistance method according to claim 9, further comprising specifying that at least a portion of the boundary is a traversable boundary by assigning a respective value greater than zero as the respective attribute value of the width attribute for each one of the position points representing the portion of the boundary.

18. The driver assistance method according to claim 9, wherein the driver assistance system further comprises a data bus of the vehicle, and wherein the method further comprises transmitting the position points and the attribute values assigned to the attributes thereof, to the control device via the data bus.

19. The driver assistance method according to claim 9, wherein at least a portion of the boundary of the driving path is defined by one of the physical boundaries that has been detected, and further comprising specifying that the portion of the boundary is a non-traversable boundary by setting the attribute value of one of the attributes of each one of the position points representing the portion of the boundary to a non-traversable value which identifies the boundary as non-traversable at the respective position point.

20. The driver assistance method according to claim 9, wherein:

the traffic lane markings include a traffic lane line that bounds and defines a traffic lane on the road, the obstacles include a stationary obstacle in the traffic lane ahead of the subject vehicle, the driving path is determined to include a first path portion along the traffic lane from the subject vehicle to the obstacle, a second path portion skirting around the obstacle, and a third path portion along the traffic lane ahead of the obstacle, the boundary of the driving path includes a first boundary portion of the first path portion, a second boundary portion of the second path portion, and a third boundary portion of the third path portion, the first boundary portion is represented by ones of the position points along the traffic lane line, the second boundary portion is represented by ones of the position points skirting around the obstacle and deviating from the traffic lane line, the third boundary portion is represented by ones of the position points along the traffic lane line, and the attribute value of one of the attributes of each one of the position points of the second boundary portion is set to a non-traversable value that identifies the second boundary portion as a non-traversable boundary.

21. The driver assistance method according to claim 9, further comprising specifying that at least a first portion of the boundary is a non-traversable boundary by assigning zero as the respective attribute value of the width attribute for each one of the position points representing the first portion of the boundary, and specifying that at least a second portion of the boundary is a traversable boundary by assigning a respective value greater than zero as the respective attribute value of the width attribute for each one of the position points representing the second portion of the boundary.

22. The driver assistance method according to claim 9, wherein the step c) comprises determining a left set of the position points to represent a left boundary of the driving path, and determining a right set of the position points to represent a right boundary of the driving path, and wherein the attribute values of the width attribute of the left set of position points indicate the lateral width of the unobstructed area available on the left side of the left set of position points, and the attribute values of the width attribute of the right set of position points indicate the lateral width of the unobstructed area available on the right side of the right set of position points.

* * * * *